United States Patent
Kanayama et al.

(10) Patent No.: US 11,526,592 B2
(45) Date of Patent: Dec. 13, 2022

(54) WORKING MACHINE MANAGEMENT SYSTEM AND WORKING MACHINE

(71) Applicant: HONDA MOTOR CO., LTD., Tokyo (JP)

(72) Inventors: Hisanori Kanayama, Saitama (JP); Takashi Hashizume, Saitama (JP); Keiichiro Bungo, Saitama (JP); Akifumi Fujima, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 371 days.

(21) Appl. No.: 16/638,709

(22) PCT Filed: Oct. 3, 2017

(86) PCT No.: PCT/JP2017/036030
§ 371 (c)(1),
(2) Date: Feb. 12, 2020

(87) PCT Pub. No.: WO2019/069381
PCT Pub. Date: Apr. 11, 2019

(65) Prior Publication Data
US 2021/0192034 A1    Jun. 24, 2021

(51) Int. Cl.
*B60R 25/04* (2013.01)
*G06F 21/35* (2013.01)
*F02D 29/02* (2006.01)

(52) U.S. Cl.
CPC .............. *G06F 21/35* (2013.01); *B60R 25/04* (2013.01); *F02D 29/02* (2013.01);
(Continued)

(58) Field of Classification Search
CPC .......... G06F 21/35; G06F 21/88; G06F 21/44; G06F 21/34; G06F 21/31; G06F 21/30;
(Continued)

(56) References Cited

U.S. PATENT DOCUMENTS

2006/0255910 A1* 11/2006 Fukushima ............. E05B 49/00
                                                                340/5.26
2010/0007459 A1    1/2010 Manita et al.

FOREIGN PATENT DOCUMENTS

| JP | 2010-017129 A | 1/2010 |
| JP | 2016-136333 A | 7/2016 |
| JP | 2016-160669 A | 9/2016 |

OTHER PUBLICATIONS

Jan. 9, 2018, International Search Report issued for related PCT Application No. PCT/JP2017/036030.

(Continued)

*Primary Examiner* — Jung Kim
(74) *Attorney, Agent, or Firm* — Paratus Law Group, PLLC

(57) ABSTRACT

A working machine management system includes a working machine having a prime mover and a control unit and a key device which is detachable from the working machine and is used for operating the working machine. The key device stores first authentication information for identifying a drivable working machine and second authentication information necessary for the prime mover to continuously operate. When the key device is attached to the working machine, the control unit confirms validity of the key device based on the first authentication information, compares input information from the outside with the second authentication information to determine whether the prime mover can be operated if the key device is valid, and controls operation of the prime mover according to the determination result.

9 Claims, 5 Drawing Sheets

(52) U.S. Cl.
CPC ..... *B60R 2025/041* (2013.01); *B60R 2325/20* (2013.01); *B60R 2325/308* (2013.01)

(58) Field of Classification Search
CPC .............. B60R 25/04; B60R 2025/041; B60R 2325/20; B60R 2325/308; B60R 25/24; B60R 25/00; B60R 25/01; B60R 25/2063; B60R 2325/205; F02D 29/02; F02D 17/04
See application file for complete search history.

(56) References Cited

OTHER PUBLICATIONS

Jan. 9, 2018, International Search Opinion issued for related PCT Application No. PCT/JP2017/036030.

* cited by examiner

WORKING MACHINE MANAGEMENT SYSTEM AND WORKING MACHINE

CROSS REFERENCE TO PRIOR APPLICATION

This application is a National Stage Patent Application of PCT International Patent Application No. PCT/JP2017/036030 (filed on Oct. 3, 2017) under 35 U.S.C. § 371, which is hereby incorporated by reference in its entirety.

TECHNICAL FIELD

The present invention relates to a working machine having a prime mover and a control unit for controlling operation of the prime mover, and a working machine management system.

BACKGROUND ART

Patent Document 1 describes an anti-theft device which prevents battery-less equipment from being stolen. The battery-less device is a device such as a working machine equipped with a general-purpose internal combustion engine having a power generation coil which supplies operation power in accordance with operation of a recoil starter, such as a lawn mower. The anti-theft device of Patent Document 1 includes an electronic key which can be carried by a device operator and stores authentication data and authentication means provided in the device for authenticating whether the electronic key is a regular key by comparing the authentication data output from the electronic key with data stored in advance. The authentication means executes the authentication when the recoil starter is operated and power is supplied. When it is authenticated as the regular key by the authenticating means, the internal combustion engine is normally operated. On the other hand, when it is not authenticated as the regular key, the operation of the internal combustion engine is stopped.

RELATED ART REFERENCE

Patent Document

Patent Document 1: JP-A-2010-017129

SUMMARY OF THE INVENTION

Problems to be Solved by the Invention

According to the anti-theft device of Patent Document 1, although the internal combustion engine is started once by the operation of the recoil starter, it is stopped immediately when the electronic key is not authenticated as a regular key, so that the device can be prevented from being stolen. However, when even the regular electronic key is stolen together with the device, the device can be normally used by the stolen electronic key. For this reason, although the anti-theft device of Patent Document 1 serves as deterrent against device theft, it is necessary to securely manage the electronic key so that the electronic key is not stolen together with the device.

An object of the invention is to provide a working machine management system and a working machine capable of improving deterrence against theft.

Means for Solving the Problems

The invention provides the following aspects.

According to a first aspect, there is provided a working machine management system which includes a working machine having a prime mover (for example, a general-purpose engine E in embodiments described below) and a control unit (for example, an ECU 80 in the embodiments described below) which controls operation of the prime mover and a key device (for example, a key device 100 in the embodiments described below) which is detachable from the working machine and is a key for operating a previously associated working machine, in which the key device stores first authentication information for identifying a working machine drivable by the key device and second authentication information necessary for the prime mover of the drivable working machine to continuously operate, when the key device is attached to the working machine, the control unit, confirms validity of the key device based on the first authentication information stored in the key device, compares information input from the outside with the second authentication information stored in the key device to determine whether the prime mover can be operated if the key device is valid, and controls operation of the prime mover according to a result of the determination.

According to a second aspect, there is provided the working machine management system according to the first aspect, where the control unit permits the prime mover to start and idle when the key device attached to the working machine is valid as a result of confirming the validity of the key device based on the first authentication information.

According to a third aspect, there is provided the working machine management system according to the first aspect or the second aspect, in which the control unit stops or prohibits the operation of the prime mover unless it is confirmed that the key device is valid and, within a preset time, the information input from the outside is compared with the second authentication information to determine that the prime mover can be operated.

According to a fourth aspect, there is provided the working machine management system according to any one of the first aspect to the third aspect, in which the second authentication information includes identification information and date/time information regarding a preset period, and the control unit determines that the operation of the prime mover is possible when information input from the outside is input during the preset period and matches the identification information.

According to a fifth aspect, there is provided the working machine management system according to any one of the first aspect to the fourth aspect, in which the key device has a communication unit (for example, the ECU 80 in the embodiments described below) capable of wireless communication with a predetermined communication terminal, and the information input from the outside is included in a signal transmitted from the predetermined communication terminal and received by the communication unit.

According to sixth aspect, there is provided a working machine which includes a prime mover (for example, the general-purpose engine E in the embodiments described below) and a control unit (for example, the ECU 80 in the embodiments described below) which controls operation of the prime mover, where a key device (for example, the key device 100 in the embodiments described below), which is a key for operating a previously associated working machine, is detachable from the working machine, the key device stores first authentication information for identifying an operable working machine and second authentication information necessary for the prime mover of the operable working machine to continuously operate, when the key device is attached to the working machine, the control unit, confirms validity of the key device based on the first authentication information stored in the key device, compares information input from the outside with the second authentication information stored in the key device to determine whether the prime mover can be operated if the key device is valid, and controls operation of the prime mover according to a result of the determination.

According to a seventh aspect, there is provided a working machine management system which includes a working machine having a prime mover (for example, the general-purpose engine E in the embodiments described below) and a control unit (for example, the ECU 80 in the embodiments described below) which controls operation of the prime mover and a key device (for example, the key device 100 in the embodiments described below) which is detachable from the working machine and is a key for operating a previously associated working machine, in which the key device includes, a storage unit (for example, a memory 104 in the embodiments described below) which stores first authentication information for identifying a working machine drivable by the key device and second authentication information necessary for the prime mover of the drivable working machine to continuously operate, and a processing unit (for example, a CPU 103 in the embodiments described below) which determines whether the prime mover of the working machine to which the key device is attached can be operated, when the key device is attached to the working machine, the control unit, confirms validity of the key device based on the first authentication information stored by the key device, and controls operation of the prime mover according to an instruction obtained from the key device if the key device is valid, and the processing unit, compares information input from the outside with the second authentication information to determine whether the prime mover can be operated, and sends an instruction according to a result of the determination to the control unit of the prime mover.

According to an eighth aspect, there is provided the working machine management system according to the seventh aspect, in which the control unit permits the prime mover to perform idle operation when the key device attached to the working machine is valid as a result of confirming the validity of the key device based on the first authentication information, According to ninth aspect, there is provided the working machine management system according to any one of the seventh aspect and the eighth aspect, in which the processing unit sends an instruction to stop or prohibit the operation of the prime mover to the control unit of the prime mover unless the key device, which is associated in advance, is attached to the working machine, and within a preset time, the information input from the outside is compared with the second authentication information to determine that the prime mover can be operated.

According to a tenth aspect, there is provided the working machine management system according to any one of the seventh aspect to the ninth aspect, in which the second authentication information includes identification information and date/time information regarding a preset period, and the processing unit determines that the prime mover can be operated and sends an instruction to permit the operation of the prime mover to the control unit of the prime mover when the information input from the outside is input during the preset period and matches the identification information.

According to an eleventh aspect, there is provided the working machine management system according to any one of the seventh aspect to the tenth aspect, in which the key device includes a communication unit (for example, a wireless unit 109 in the embodiments described below) capable of wireless communication with a predetermined communication terminal, and the information input from the outside is included in a signal transmitted from the predetermined communication terminal and received by the communication unit.

Advantageous Effects of the Invention

According to the first aspect, the sixth aspect, and the seventh aspect, in order to start and continuously operate the working machine, not only is the key device attached to the working machine valid, but it is necessary to be determined that the prime mover can be operated as a result of the comparing the information input from the outside with the second authentication information when the key device is attached to the working machine. That is, the working machine and the key device alone cannot continue to operate the working machine and it is necessary to input correct information for comparing with the second authentication information. For this reason, those who try to steal the working machine need to not only steal things such as the working machine and the key device, but also to find out the correct information to be compared with the second authentication information. As a result, the anti-theft effect of the working machine, which cannot be used without finding out the information as well as theft of goods, can be improved and the deterrence against theft can be improved.

According to the second aspect and the eighth aspect, when the key device attached to the working machine is valid, the idle operation of a prime mover is permitted. Therefore, compared with a case where the idle operation is started after it is determined that the operation of the prime mover is possible by comparing the information input from the outside with the second authentication information, the idle operation can be performed at an earlier stage. Therefore, the idle operation can be performed from an early stage. Thus, when it is necessary to go through a warm-up process to operate the prime mover at a high speed, the prime mover can be operated at a high speed from an early point.

According to the third aspect and the ninth aspect, even when the valid key device is attached to the working machine, the operation of the prime mover is stopped or prohibited unless it is determined that the prime mover can be operated within the preset time. As described above, whether the operation of the prime mover can be continued is determined within the preset time, so that the anti-theft effect of the working machine can be further enhanced. As a result, the deterrence against theft can be further improved.

According to the fourth aspect and the tenth aspect, even when the information input from the outside matches the identification information, if the information input from the outside is input outside the preset period, the prime mover is not considered capable of driving. For this reason, even when the working machine and the key device are stolen and even information that matches the identification information is stolen, the working machine cannot be used after the preset period has elapsed. Therefore, the anti-theft effect of the working machine is further increased and the deterrence against theft can be still further improved.

According to the fifth aspect and the eleventh aspect, the information for comparing with the second authentication information is input by transmitting a signal including the information from the predetermined communication terminal to the communication unit. Therefore, a person who can operate the predetermined communication terminal can input the information for comparing with the second authentication information from the outside by a simple method.

MODES FOR CARRYING OUT THE INVENTION

Hereinafter, embodiments of the invention will be described with reference to the drawings. The drawings are viewed in the direction of reference letters.

First Embodiment

Figure 1:
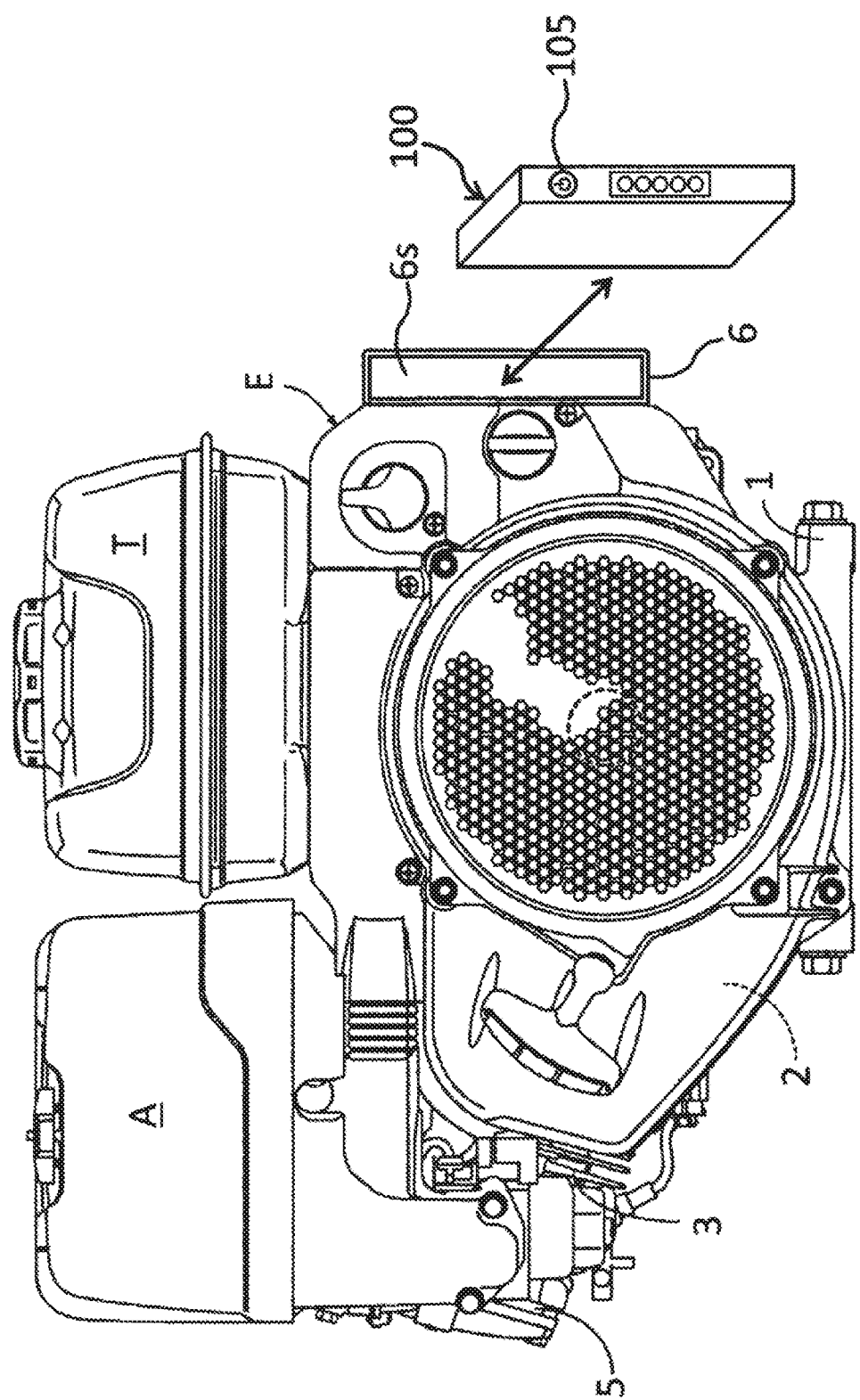
FIG. 1 is a diagram showing a relationship between a general-purpose engine and a key device which constitute a working machine management system of a first embodiment.

FIG. 1 is a diagram illustrating a relationship between a general-purpose engine and a key device which constitute a working machine management system according to a first embodiment. As illustrated in FIG. 1, a key device 100 can be attached to and detached from a general-purpose engine E. The general-purpose engine E cannot be started unless the key device 100 is attached to the general-purpose engine E. The general-purpose engine E which can be operated by the key device 100 is associated with the key device 100 in advance. The key device 100 is set with recognition information necessary for the general-purpose engine E associated in advance to continue to operate. The general-purpose engine E is used as a power source for small industrial working machines for agriculture, construction, or the like.

As illustrated in FIG. 1, the general-purpose engine E includes a crankcase 2 having an installation flange 1 at the bottom, a cylinder block 3 extending obliquely from one side of the crankcase 2, and a cylinder head 5 joined to an end surface of cylinder block 3 via a gasket. A fuel tank T is attached to the upper part of the crankcase 2 and an air cleaner A is attached to the upper part of the cylinder block 3. The installation flange 1 is installed in a device which uses the general-purpose engine E as a power source.

On the other side of the crankcase 2 of the general-purpose engine E, a receptacle 6 for attaching the key device 100 to the general-purpose engine E is provided integrally with the general-purpose engine E. A terminal which can be connected to a terminal provided on the back surface of the key device 100 is provided in the back of an accommodation space 6s of the receptacle 6. When the key device 100 is inserted into the accommodation space 6s of the receptacle 6 and the terminals are electrically connected to each other, the key device 100 becomes ready to start and power is supplied from the key device 100 to the general-purpose engine E, and further electrical signals can be transmitted between an Electric Control Unit (ECU) which controls the operation of the general-purpose engine E and a Central Processing Unit (CPU) of the key device 100.

Figure 2:
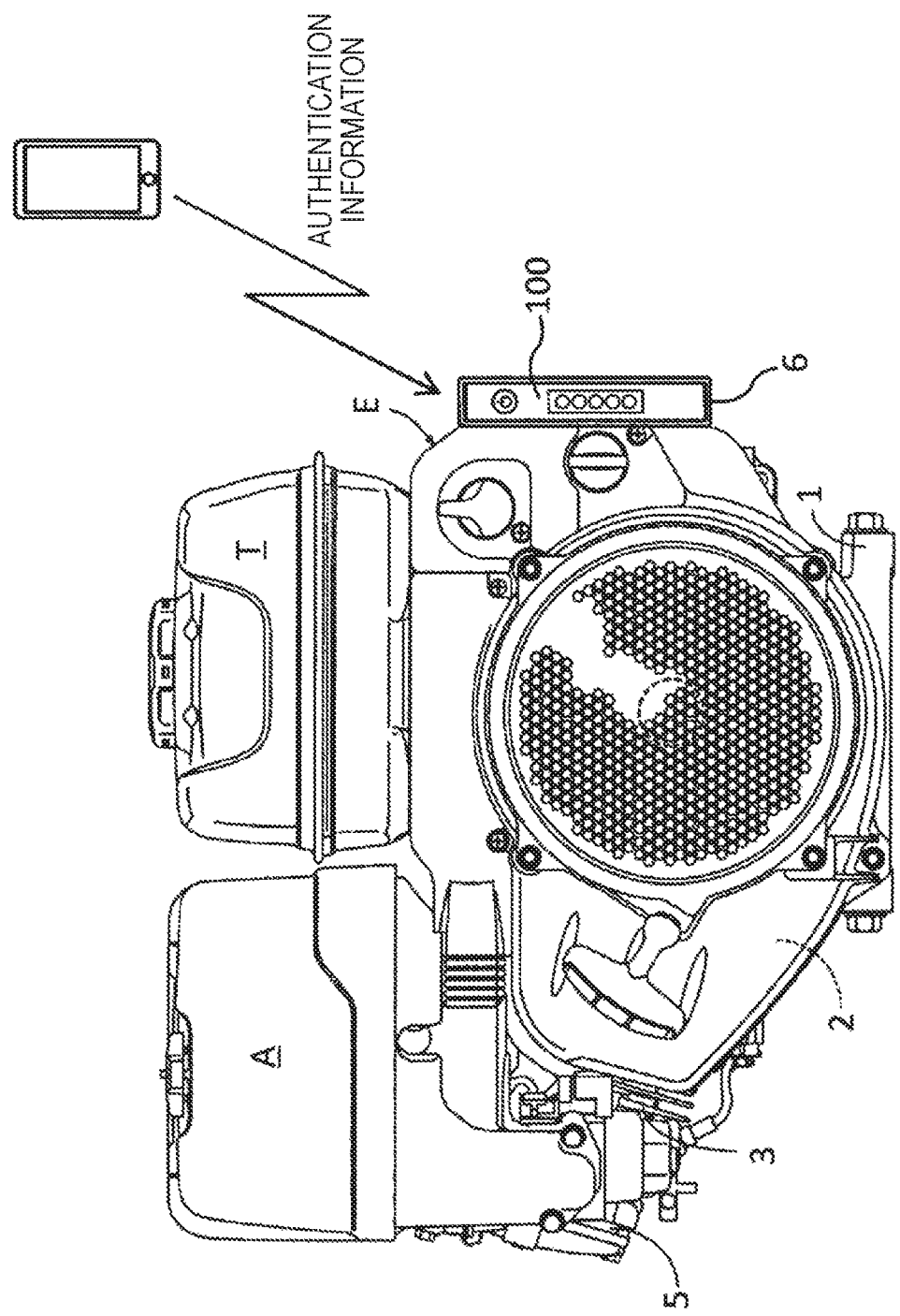
FIG. 2 is a diagram illustrating that authentication information is input to the key device attached to a receptacle of the general-purpose engine.

When the key device 100 is attached to the receptacle 6, if the attached key device 100 is a valid device, that is, if it is a key device previously associated with the general-purpose engine E, the ECU of the general-purpose engine F permits the start-up and idle operation of the general-purpose engine and the general-purpose engine F starts when a power switch 105 provided in front of the key device 100 is turned on. However, even when the general-purpose engine F is started, as illustrated in FIG. 2, if authentication information necessary for continuous operation of the general-purpose engine E is not input from the outside until the time when the key device 100 is determined to be the valid device and a preset time is elapses, the operation of the general-purpose engine E is stopped.

Figure 3:
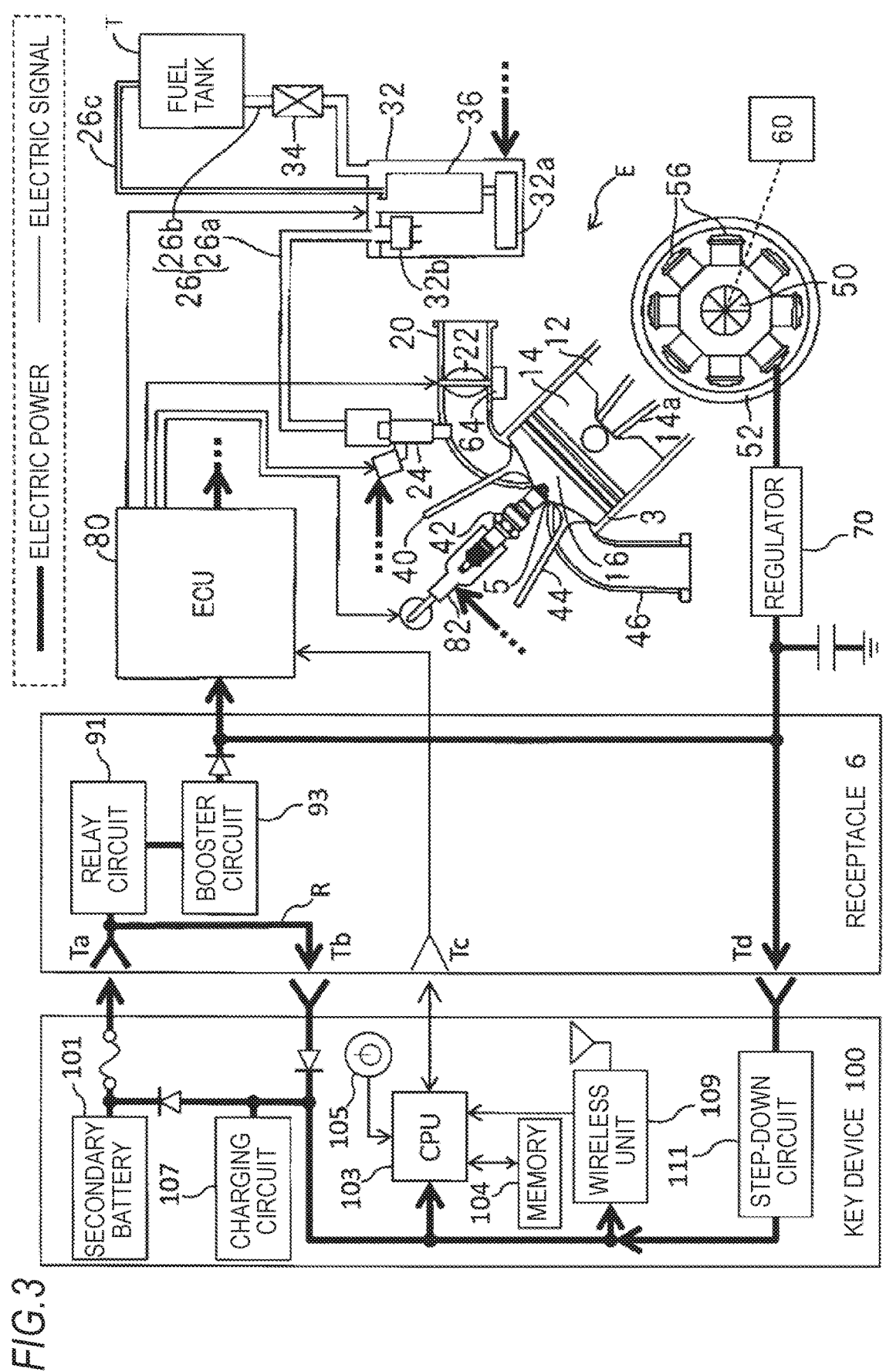
FIG. 3 is a diagram illustrating internal structures of the general-purpose engine, the receptacle, and the key device and their mutual relationships.

Hereinafter, with reference to FIG. 3, the internal configurations of the general-purpose engine E, the receptacle 6, and the key device 100 and their mutual relationship will be described.

[General-Purpose Engine E]

First, the internal configuration of the general-purpose engine F will be described. In a cylinder 12 formed inside the cylinder block 3 of the general-purpose engine F, a piston 14 is accommodated so as to freely reciprocate. The cylinder head 5 is attached to the cylinder block 3 and a combustion chamber 16 is formed between the top of the piston 14 and the cylinder head 5. An intake pipe 20 is connected to the combustion chamber 16. A throttle valve 22 is disposed in the intake pipe 20 and an injector 24 is disposed in the vicinity of an intake port downstream thereof.

An electric motor (actuator, more specifically, a stepping motor) 64 is connected to the throttle valve 22. The electric motor 64 is configured to open and close the throttle valve 22 independently of the operation of an accelerator lever (not illustrated), That is, the throttle valve 22 is configured as a Drive By Wire type.

The injector 24 is connected to the fuel tank T via a fuel supply pipe 26. More specifically, the injector 24 is connected to a sub-fuel tank 32 via a first fuel supply pipe 26a and the sub-fuel tank 32 is connected to the fuel tank T via a second fuel supply pipe 26b. A low pressure pump 34 is inserted in the second fuel supply pipe 26b and the fuel (gasoline) stored in the fuel tank T is pumped up and pumped to the sub-fuel tank 32. A fuel pump (high pressure pump) 36 is disposed in the sub-fuel tank 32.

The fuel pump 36 pressurizes the fuel filtered by a filter 32a to a high pressure and pumps the fuel to the injector 24 through the first fuel supply pipe 26a while adjusting the pressure by a regulator 32b. Part of the fuel in the sub-fuel tank 32 is returned to the fuel tank T through a return pipe 26c.

The intake air drawn from an air cleaner A flows through the intake pipe 20, reaches the intake port in a state where the flow rate thereof is adjusted by the throttle valve 22, and mixes with the fuel injected from the injector 24 to form an air-fuel mixture. The air-fuel mixture flows into the combustion chamber 16 when an intake valve 40 is opened and burns when a spark plug 42 is ignited by an ignition coil 82 to drive the piston 14. The exhaust gas generated by the combustion flows through an exhaust pipe 46 and is released to the outside when an exhaust valve 44 is opened.

In the cylinder block 3, the crankcase 2 is attached to a side facing the cylinder head 5 and a crankshaft 50 is rotatably accommodated therein. The crankshaft 50 is connected to the piston 14 via a connecting rod 14a and rotates according to the driving of the piston 14.

A flywheel 52 is coaxially attached to one end of the crankshaft 50. In addition, a power generation coil 56 is attached to the inner position of the crankcase 2. The power generation coil 56 functions as an alternating current generator (ACG) which generates an electromotive force by intermingling with the magnetic flux of permanent magnets in association with the relative rotation with the plurality of permanent magnets (not illustrated) attached to the back surface side of the flywheel 52. The electromotive force generated in the power generation coil 56 is rectified by a regulator 70 to be converted into an operating voltage (for example, 12 V) of an ECU 80.

The other end of the crankshaft 50 is connected to equipment 60 which uses the general-purpose engine E as a power source.

The operations of the fuel pump 36, the regulator 32b, the injector 24, the ignition coil 82, and the electric motor 64 described above are controlled by the ECU 80 of the general-purpose engine E. Further, the ECU 80 communicates with the CPU 103 of the key device 100 through the terminal of the receptacle 6. Based on the information obtained from the key device 100, the ECU 80 determines whether the general-purpose engine E is operating and whether it can be continuously operated and controls the operation of the general-purpose engine E according to the determination results.

The power supply to the ECU 80 is performed from the key device 100 through the receptacle 6 until the key device 100 is mounted on the receptacle 6 and the general-purpose engine E starts up and operates stably, and then, if the general-purpose engine E operates stably, it is covered by the power generation of the power generation coil 56. Similarly, the power supply to the fuel pump 36, the regulator 32b, the injector 24, and the spark plug 42 is also performed from the key device 100 through the receptacle 6 until the general-purpose engine E operates stably, and then, if the general-purpose engine E operates stably, it is covered by the power generation of the power generation coil 56. However, the power supply to the fuel pump 36, the regulator 32b, the injector 24 and the spark plug 42 is controlled by the ECU 80.

[Receptacle 6]

Next, the internal configuration of the receptacle 6 provided integrally with the general-purpose engine E will be described. The receptacle 6 includes four terminals Ta to Td, a relay circuit 91, and a booster circuit 93.

The terminal Ta is connected to one end of a switch contact included in the relay circuit 91. When the key device 100 is attached to the receptacle 6, the output voltage of the key device 100 is applied to the terminal Ta.

The terminal Tb is connected to the terminal Ta through a conduction path R inside the receptacle 6, and when the key device 100 is attached to the receptacle 6, the output voltage of the key device 100 applied to the terminal Ta is applied to the terminal Tb.

The terminal Tc is connected to the ECU 80 of the general-purpose engine E. When the key device 100 is attached to the receptacle 6, the terminal Tc is connected to the CPU 103 of the key device 100.

The terminal Td is connected to the output side of the regulator 70 of the general-purpose engine E. When the key device 100 is attached to the receptacle 6, the terminal Td is connected to the input side of a step-down circuit 111 of the key device 100.

The relay circuit 91 is a switch having a configuration in which one end of the switch terminal is connected to the terminal Ta and the other end is connected to the input side of the booster circuit 93. The relay circuit 91 is closed if the output voltage of the regulator 70 when a rotating electrical machine including the power generation coil 56 functions as a generator is equal to or lower than a predetermined value and opened if the voltage exceeds the predetermined value. The predetermined value is a rated output voltage set in the booster circuit 93.

The booster circuit 93 boosts the output voltage of the key device 100 applied via the relay circuit 91 at a predetermined boost rate. The output voltage (for example, 12 V) of the booster circuit 93 is applied to the ECU 80.

The output of the booster circuit 93 is connected to one end on the terminal Td side of the regulator 70 of the general-purpose engine E in addition to the ECU 80. Therefore, when, after starting the general-purpose engine E, the general-purpose engine E operates stably, if the voltage obtained by converting the generated voltage of the rotating electrical machine including the power generation coil 56 into direct current with the regulator 70 is higher than the output voltage of the booster circuit 93, the switch of the relay circuit 91 is opened, so the power supply path from the key device 100 to the ECU 80 is opened. In this case, the voltage obtained by converting the generated voltage into direct current with the regulator 70 is applied to the ECU 80 of the general-purpose engine E.

[Key Device 100]

Next, the internal configuration of the key device 100 will be described. The key device 100 includes a secondary battery 101, the CPU 103, a memory 104, the power switch 105, a charging circuit 107, a wireless unit 109, and the step-down circuit 111.

The secondary battery 101 is a chargeable/dischargeable lithium ion battery which outputs a voltage of about 5 V, for example. The output voltage of the secondary battery 101 is applied to the terminal Ta of the receptacle 6 when the key device 100 is attached to the receptacle 6.

The CPU 103 controls the operation of the key device 100 including writing and reading of information with the memory 104, communication with the ECU 80 of the general-purpose engine E, charging operation of the charging circuit 107, operation of the wireless unit 109, and the like. The electrical path from the secondary battery 101 to the CPU 103 is not conductive when the key device 100 is in a single state, that is, when the key device 100 is not attached to the receptacle 6. However, when the key device 100 is attached to the receptacle 6, a conduction path R including the terminal Ta and the terminal Tb formed in the receptacle 6 is inserted between the secondary battery 101 and the CPU 103, and thus a power supply circuit from the secondary battery 101 to the CPU 103 via the receptacle 6 is established.

For example, the wireless unit 109 performs wireless communication with a portable information terminal owned by a user of the key device 100. The power supply from the secondary battery 101 to the wireless unit 109 is not performed when the key device 100 is in a single state, but is performed in a state where the key device 100 is attached to the receptacle 6, as similar to the CPU 103.

The memory 104 stores first authentication information for identifying the general-purpose engine E which can be operated by the key device 100 and second authentication information necessary for the general-purpose engine E to continue to operate. The first authentication information is information related to the general-purpose engine E associated with the key device 100 in advance. The second authentication information includes identification information such as a number set in advance by an administrator of the general-purpose engine E and date/time information regarding a preset period during which the administrator permits the use of the general-purpose engine E. Writing the first authentication information or the second authentication information to the memory 104 is performed when the administrator of the general-purpose engine E attaches the key device 100 to the receptacle 6 and the wireless unit 109 receives an update signal of the first authentication information or the second authentication information. That is, when the administrator operates a portable information terminal which can communicate with the wireless unit 109 and instructs to update the first authentication information or the second authentication information, a wireless signal indicating the instruction content is sent from the portable information terminal to the wireless unit 109. Therefore, the CPU 103 writes new first authentication information or second authentication information in the memory 104 based on the instruction content indicated by the signal received by the wireless unit 109.

The power switch 105 is operated when the general-purpose engine E is started or stopped. A signal corresponding to the operation of the power switch 105 is sent from the CPU 103 to the ECU 80 of the general-purpose engine E.

The charging circuit 107 charges the secondary battery 101 having a reduced charging rate in a state where the key device 100 removed from the receptacle 6 is connected to an external power supply via a cable.

The step-down circuit 111 steps down the output voltage of the regulator 70 applied via the terminal Id of the receptacle 6 to, for example, 5 V in a state Where the key device 100 is attached to the receptacle 6. The voltage stepped down by the step-down circuit 111 is applied to the CPU 103 and the wireless unit 109.

Figure 4:
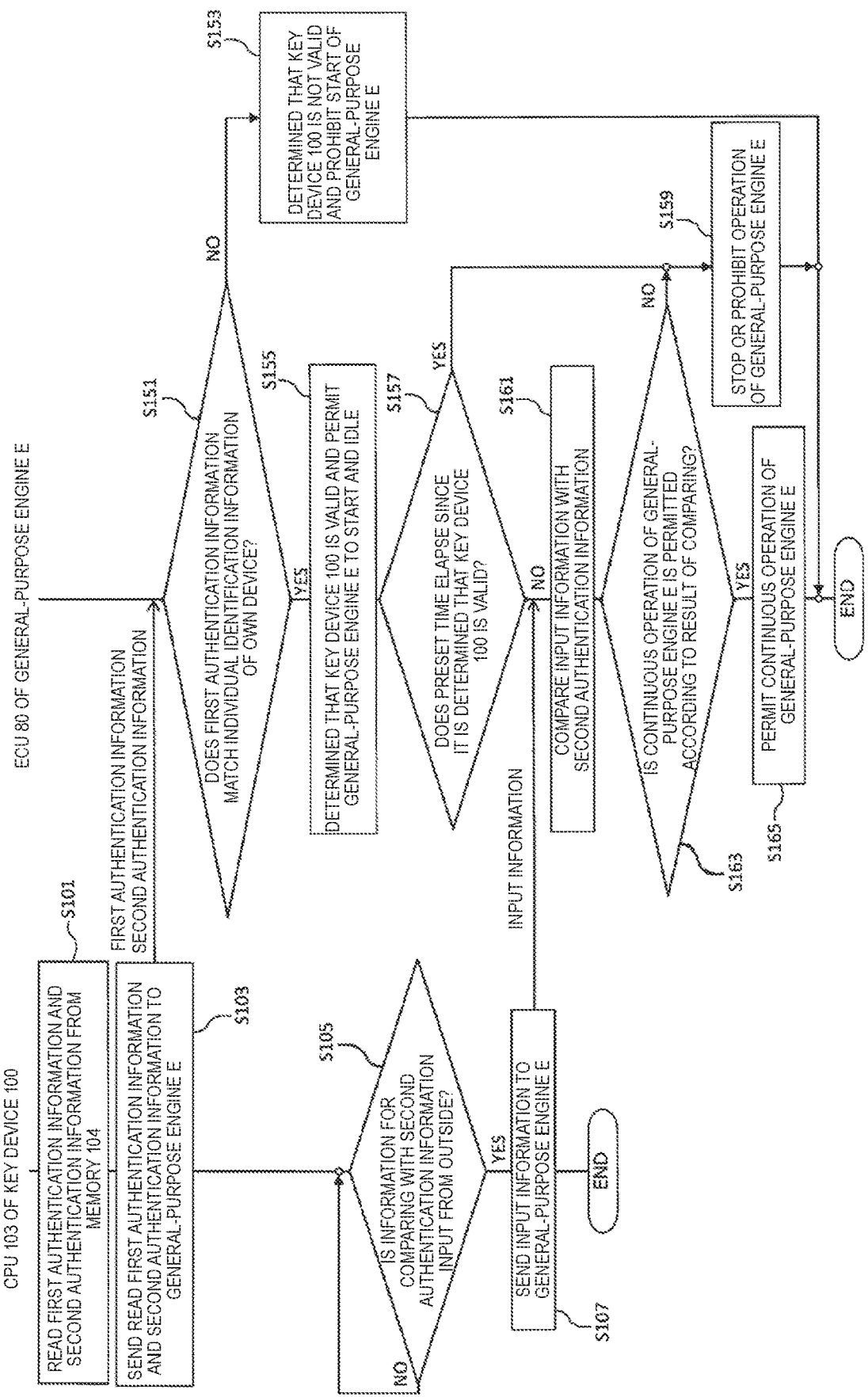
FIG. 4 is a flowchart illustrating processing of the first embodiment performed by a CPU of the key device and processing of the first embodiment performed by an ECU of the general-purpose engine when the key device is mounted on the receptacle.

Next, the process of the first embodiment performed by the CPU 103 of the key device 100 and the process of the first embodiment performed by the ECU 80 of the general-purpose engine E when the key device 100 is attached to the receptacle 6 will be described with reference to FIG. 4. When the key device 100 is attached to the receptacle 6, the CPU 103 of the key device 100 reads the first authentication information and the second authentication information from the memory 104 (Step S101) and sends the read first authentication information and second authentication information to the ECU 80 of the general-purpose engine E (Step S103). Next, the CPU 103 determines whether information for comparing with the second authentication information is input from the outside of the key device 100 via the wireless unit 109 (Step S105) and sends information (hereinafter referred to as "input information") input from the outside to the ECU 80 of the general-purpose engine E (Step S107).

The ECU 80 of the general-purpose engine E determines whether the first authentication information sent from the key device 100 in Step S103 matches the individual identification information of the own device (Step S151), and when the first authentication information does not match the individual identification information, the process proceeds to Step S153, and when it matches, the process proceeds to Step S155. In Step S153, the ECU 80 determines that the key device 100 attached to the receptacle 6 is not valid and prohibits the start of the general-purpose engine E. On the other hand, in Step S155, the ECU 80 determines that the key device 100 attached to the receptacle 6 is valid and permits the general-purpose engine E to start and idle.

After Step S155, the ECU 80 determines Whether a preset time has elapsed since it is determined that the key device 100 is valid in Step S155 (Step S157), and when the preset time has elapsed, the process proceeds to Step S159, and when the preset time has not elapsed, the process proceeds to Step S161. In Step S159, the ECU 80 stops or prohibits the operation of the general-purpose engine E. As a result, when the ECU 80 performs Step S159, if the general-purpose engine E is in idle operation, the operation of the general-purpose engine E is stopped, and if the general-purpose engine E is not started, the starting of the general-purpose engine E is prohibited.

In Step S161, the ECU 80 compares the input information sent from the key device 100 in Step S107 with the second authentication information sent from the key device 100 in Step S103. The ECU 80 determines whether continuous operation of the general-purpose engine E is permitted according to the result of the comparing in Step S161 (Step S163). In Step S163, when the input information matches the identification information of the second authentication information and the input date/time of the input information is within a period indicated by the date/time information of the second authentication information, continuous operation of the general-purpose engine E is permitted. In other words, when the input information does not match the identification information of the second authentication information or when the input date/time of the input information is outside the period indicated by the date/time information of the second authentication information, continuous operation of the general-purpose engine E is not permitted.

When the determination in Step S163 does not permit continuous operation of the general-purpose engine E, the process proceeds to Step S159 and the ECU 80 stops or prohibits the operation of the general-purpose engine E. On the other hand, when the determination in Step S163 permits continuous operation of the general-purpose engine E, the process proceeds to Step S165 and the ECU 80 permits continuous operation of the general-purpose engine E. As a result, if the general-purpose engine E is in idle operation when the ECU 80 performs Step S165, the operation of the general-purpose engine E is continued, and if the general-purpose engine E is not started, the starting of the general-purpose engine E and the continuous operation thereof are permitted.

Second Embodiment

The difference between the working machine management system of a second embodiment and the working machine management system of the first embodiment is that the CPU 103 of the key device 100, not the ECU 80 of the general-purpose engine E, performs a process of determining whether the general-purpose engine E with the valid key device 100 attached can be operated continuously. In this embodiment, the ECU 80 of the general-purpose engine E controls the operation of the general-purpose engine F in accordance with an instruction from the key device 100 regarding whether the general-purpose engine E can be continuously operated. Except for this point, the second embodiment is the same as the first embodiment. Therefore, the same or equivalent parts as those of the first embodiment are denoted by the same or corresponding reference letters and numerals and description thereof will be simplified or omitted.

Figure 5:
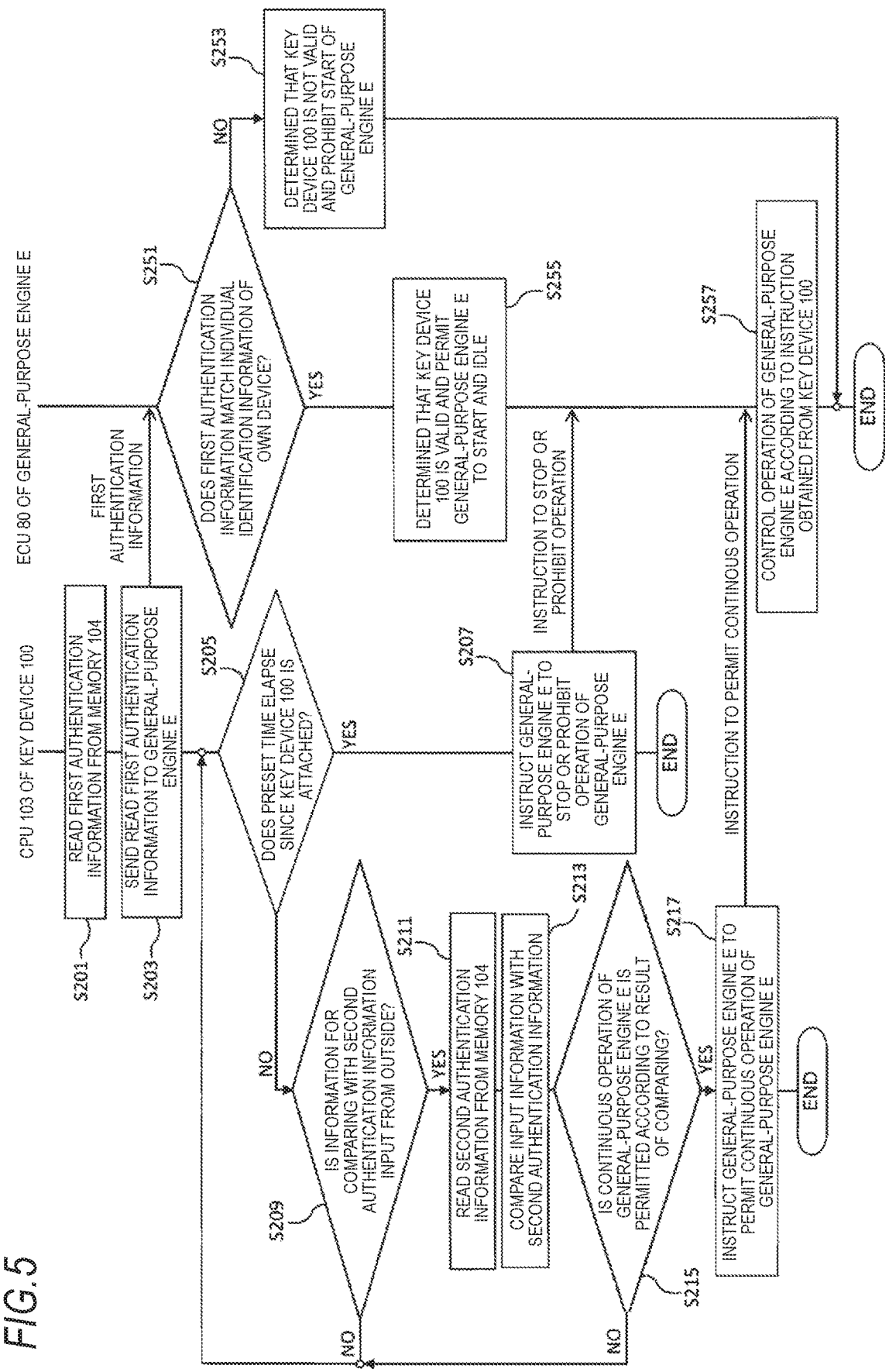
FIG. 5 is a flowchart illustrating processing of a second embodiment performed by a CPU of a key device and processing of the second embodiment performed by an ECU of a general-purpose engine when the key device is mounted on a receptacle.

Hereinafter, the processing of the second embodiment performed by the CPU 103 of the key device 100 and the processing of the second embodiment performed by the ECU 80 of the general-purpose engine E when the key device 100 is attached to the receptacle 6 will be described with reference to FIG. 5. When the key device 100 is attached to the receptacle 6, the CPU 103 of the key device 100 reads the first authentication information from the memory 104 (Step S201) and sends the read first authentication information to the ECU 80 of the general-purpose engine E (Step S203). Thereafter, the CPU 103 performs Steps S205 to S217 described below The ECU 80 of the general-purpose engine E determines whether the first authentication information sent from the key device 100 in Step S203 matches the individual identification information of the own device (Step S251), and when the first authentication information does not match the individual identification information, the process proceeds to Step S253, and when it matches, the process proceeds to Step S255 in Step S253, the ECU 80 determines that the key device 100 attached to the receptacle 6 is not valid and prohibits the start of the general-purpose engine E. On the other hand, in Step S255, the ECU 80 determines that the key device 100 attached to the receptacle 6 is valid and permits the general-purpose engine E to start and idle.

After Step S255, the ECU 80 controls the operation of the general-purpose engine E according to the instruction regarding whether the general-purpose engine E can be continuously operated from the key device 100 (Step S257). For this reason, the ECU 80 waits for the instruction regarding whether the general-purpose engine E can be continuously operated from the key device 100, and then performs Step S257. The Instruction regarding whether the general-purpose engine E can be operated continuously, which is sent to the ECU 80 of the general-purpose engine E, is sent when the CPU 103 of the key device 100 performs Steps S205 to S217 illustrated in FIG. 5.

In Step S205, the CPU 103 of the key device 100 determines whether a preset time has elapsed since the key device 100 was attached to the receptacle 6, and when the preset time has elapsed, the process proceeds to Step S207, and when the preset time has not elapsed, the process proceeds to Step S209. In Step S207, the CPU 103 sends an instruction to stop or prohibit the operation of the general-purpose engine E to the ECU 80 of the general-purpose engine E. As a result, if the general-purpose engine E is in idle operation when the ECU 80 performs Step S257, the operation of the general-purpose engine E is stopped, and if the general-purpose engine E is not started, the starting of the general-purpose engine E is prohibited.

In Step S209, the CPU 103 determines whether information for comparing with the second authentication information is input from the outside of the key device 100 via the wireless unit 109, and when the information described above is not input, the process returns to Step S205, and when it is input, the process proceeds to Step S211. In Step S211, the CPU 103 reads the second authentication information from the memory 104. Next, the CPU 103 compares the information (hereinafter referred to as "input information") input from the outside of the key device 100 with the second authentication information (Step S213).

The CPU 103 determines whether continuous operation of the general-purpose engine E is permitted according to the result of the comparing in Step S213 (Step S215). In Step S215, when the input information matches the identification information of the second authentication information and the input date/time of the input information is within the period indicated by the date/time information of the second authentication information, continuous operation of the general-purpose engine E is permitted. In other words, when the input information does not match the identification information of the second authentication information or when the input date/time of the input information is outside the period indicated by the date/time information of the second authentication information, continuous operation of the general-purpose engine E is not permitted. The CPU 103 returns to Step S205 when the determination result in Step S215 does not permit the continuous operation of the general-purpose engine E and proceeds to Step S217 when the continuous operation is permitted.

In Step S217, the CPU 103 sends an instruction to permit continuous operation of the general-purpose engine E to the ECU 80 of the general-purpose engine E. As a result, when the ECU 80 performs Step S257, if the general-purpose engine E is in idle operation, the operation of the general-purpose engine E is continued, and if the general-purpose engine E is not started, the starting of the general-purpose engine E and continuous operation thereof are permitted.

As described above, according to each of the embodiments described above, in order to start and continuously operate the general-purpose engine E, not only is the key device 100 attached to the general-purpose engine E valid, but the continuous operation of the general-purpose engine E needs to be permitted as a result of the comparing the information (input information) input from the outside with the second authentication information when the valid key device 100 is attached to the general-purpose engine E. That is, the general-purpose engine E and the key device 100 alone cannot continue to operate the general-purpose engine E and it is necessary to input correct information for comparing with the second authentication information. For this reason, those who try to steal the general-purpose engine E need to not only steal things such as the general-purpose engine E and the key device, but also to find out the correct information to be compared with the second authentication information. As a result, the anti-theft effect of the general-purpose engine E, which cannot be used without finding out the information as well as theft of goods, can be improved and the deterrence against theft can be improved.

In addition, when the key device 100 attached to the general-purpose engine E is valid, the idle operation of a prime mover is permitted. Therefore, compared with a case where the idle operation is started after it is determined that the operation of the general-purpose engine E is possible by comparing the input information with the second authentication information, the idle operation can be performed at an earlier stage. The general-purpose engine E needs to go through a warm-up process in order to operate at a high speed. Thus, when the idle operation can be performed from an early stage, the general-purpose engine E can be operated at a high speed from an early point of time.

Also, even when the valid key device 100 is attached to the general-purpose engine E, the operation of the general-purpose engine E is stopped or prohibited unless continuous operation of the general-purpose engine E is permitted within the preset time. As described above, whether the operation of the general-purpose engine E can be continued is determined within the preset time, so that the anti-theft effect of the general-purpose engine E can be further enhanced. As a result, the deterrence against theft can be further improved.

Even when the input information matches the identification information of the second authentication information, if the input information is input outside the preset period, the general-purpose engine E is not allowed to continue to operate. For this reason, even when the general-purpose engine E and the key device 100 are stolen and even information that matches the identification information is stolen, the general-purpose engine E cannot be used after the preset period has elapsed. Therefore, the anti-theft effect of the general-purpose engine E is further increased and the deterrence against theft can be still further improved.

Further, the input information for comparing with the second authentication information is input to the key device 100 by transmitting a signal including the input information from the portable information terminal owned by the user of the key device 100 to the wireless unit 109. Therefore, a person who can operate the portable information terminal can input the input information for comparing with the second authentication information from the outside by a simple method.

The input information may be input not from the wireless unit 109 but from input means such as ten-keys provided in the key device. In a case of the first embodiment, a wireless unit which can communicate with a portable information terminal may be provided in the general-purpose engine and input information may be input via the wireless unit. Further, the general-purpose engine may be provided with input means such as ten-keys and input information may be input from the input means.

DESCRIPTION OF REFERENCE NUMERALS AND SIGNS

E general-purpose engine
T fuel tank
A air cleaner
1 flange
2 crankcase
3 cylinder bloc
5 cylinder head
6 receptacle
6s accommodation space
12 cylinder
14 piston
14a connecting rod
16 combustion chamber
20 intake pipe
22 throttle valve
24 injector
26 fuel supply pipe
26a first fuel supply pipe
26b second fuel supply pipe
26c return pipe
32 sub-fuel tank
32a filter
32b regulator
34 low pressure pump
36 fuel pump
40 intake valve
42 spark plug
44 exhaust valve
46 exhaust pipe
50 crankshaft
52 flywheel
56 power generation coil
60 equipment
70 regulator
64 electric motor
80 ECU
82 ignition coil
91 relay circuit
93 booster circuit
200 key device
101 secondary battery
103 CPU
204 memory
105 power switch
107 charging circuit
109 wireless unit
111 step-down circuit

The invention claimed is:

1. A working machine management system comprising:
   a working machine having a prime mover and a control unit which controls operation of the prime mover; and
   a key device which is detachable from the working machine and is a key for operating a previously associated working machine, wherein:
   the key device stores first authentication information for identifying a working machine drivable by the key device and second authentication information necessary for the prime mover of the drivable working machine to continuously operate;
   when the key device is attached to the working machine, the control unit:
      confirms validity of the key device based on the first authentication information stored in the key device;
      compares information input from the outside with the second authentication information stored in the key device to determine whether the prime mover can be operated if the key device is valid; and
      controls operation of the prime mover according to a result of the determination, and
   the control unit permits the prime mover to start and idle when the key device attached to the working machine is valid as a result of confirming the validity of the key device based on the first authentication information.

2. The working machine management system according to claim 1, wherein
   the control unit stops or prohibits the operation of the prime mover unless it is confirmed that the key device is valid and, within a preset time, the information input from the outside is compared with the second authentication information to determine that the prime mover can be operated.

3. The working machine management system according to claim 1, wherein:

the second authentication information includes identification information and date/time information regarding a preset period; and the control unit determines that the operation of the prime mover is possible when information input from the outside is input during the preset period and matches the identification information.

4. The working machine management system according to claim 1, wherein:

the key device has a communication unit capable of wireless communication with a predetermined communication terminal; and the information input from the outside is included in a signal transmitted from the predetermined communication terminal and received by the communication unit.

5. A working machine comprising:

a prime mover and a control unit which controls operation of the prime mover, wherein:

a key device, which is a key for operating a previously associated working machine, is detachable from the working machine;

the key device stores first authentication information for identifying an operable working machine and second authentication information necessary for the prime mover of the operable working machine to continuously operate;

when the key device is attached to the working machine, the control unit:

confirms validity of the key device based on the first authentication information stored in the key device;

compares information input from the outside with the second authentication information stored in the key device to determine whether the prime mover can be operated if the key device is valid; and controls operation of the prime mover according to a result of the determination; and the control unit permits the prime mover to start and idle when the key device attached to the working machine is valid as a result of confirming the validity of the key device based on the first authentication information.

6. A working machine management system comprising:

a working machine having a prime mover and a control unit which controls operation of the prime mover; and a key device which is detachable from the working machine and is a key for operating a previously associated working machine, wherein:

the key device includes:

a storage unit which stores first authentication information for identifying a working machine drivable by the key device and second authentication information necessary for the prime mover of the drivable working machine to continuously operate; and a processing unit which determines whether the prime mover of the working machine to which the key device is attached can be operated;

when the key device is attached to the working machine, the control unit:

confirms validity of the key device based on the first authentication information stored by the key device; and controls operation of the prime mover according to an instruction obtained from the key device if the key device is valid;

when the key device is attached to the working machine, the processing unit:

compares information input from the outside with the second authentication information to determine whether the prime mover can be operated; and sends an instruction according to a result of the determination to the control unit of the prime mover; and the control unit permits the prime mover to start and idle when the key device attached to the working machine is valid as a result of confirming the validity of the key device based on the first authentication information.

7. The working machine management system according to claim 6, wherein the processing unit sends an instruction to stop or prohibit the operation of the prime mover to the control unit of the prime mover unless the key device, which is associated in advance, is attached to the working machine, and within a preset time, the information input from the outside is compared with the second authentication information to determine that the prime mover can be operated.

8. The working machine management system according to claim 7, wherein:

the second authentication information includes identification information and date/time information regarding a preset period; and the processing unit determines that the prime mover can be operated and sends an instruction to permit the operation of the prime mover to the control unit of the prime mover when the information input from the outside is input during the preset period and matches the identification information.

9. The working machine management system according to claim 7, wherein:

the key device includes a communication unit capable of wireless communication with a predetermined communication terminal, and the information input from the outside is included in a signal transmitted from the predetermined communication terminal and received by the communication unit.

* * * * *